United States Patent [19]
Hickerson

[11] Patent Number: 5,186,367
[45] Date of Patent: Feb. 16, 1993

[54] MEASURING DEVICE FOR DISPENSING PREDETERMINED QUANTITIES OF A LIQUID

[76] Inventor: Frederick R. Hickerson, R.D. 6, Box 530, Newton, N.J. 07860

[21] Appl. No.: 657,835

[22] Filed: Feb. 21, 1991

[51] Int. Cl.$^5$ ............................................. G01F 11/00
[52] U.S. Cl. .................................. 222/207; 222/365; 222/453; 222/454; 222/476
[58] Field of Search ............. 222/207, 212, 454, 456, 222/476, 477, 500, 545, 451, 365, 386, 453, 444

[56] References Cited

U.S. PATENT DOCUMENTS

| | | | |
|---|---|---|---|
| 674,230 | 5/1901 | Winnemore | 222/500 |
| 2,408,463 | 10/1946 | Wright | 222/500 |
| 4,582,230 | 4/1986 | Vierkötter | 222/500 X |
| 4,875,603 | 10/1989 | Weinstein | 222/206 X |
| 4,936,490 | 6/1990 | Battegazzore | 222/211 X |
| 4,971,226 | 11/1990 | Donoghue | 222/207 |
| 5,092,497 | 3/1992 | Toedter | 222/453 X |

FOREIGN PATENT DOCUMENTS 3303562 8/1984 Fed. Rep. of Germany ...... 222/477
848527 9/1960 United Kingdom ............... 222/365

Primary Examiner—Andres Kashnikow
Assistant Examiner—Anthoula Pomrening
Attorney, Agent, or Firm—Eugene E. Renz, Jr.

[57] ABSTRACT

A device for dispensing a predetermined quantity of the liquid contents of a container. The container has a neck defining a discharge opening for dispensing contents and a chamber in the neck having an inner end and an outer end adjacent the discharge opening. A piston assembly is mounted in the chamber moveable axially therein to dispense premeasured quantities of the liquid. The piston assembly includes a first piston having a predetermined small clearance with the chamber wall forming a meniscus seal with the chamber whereby the surface tension of the liquid prevents passage of liquid past the piston until the piston extends beyond the outer end of the chamber. A valve for sealing the inner end of the chamber is connected to the piston by a shaft and spaced at a fixed distance therefrom to define the predetermined volume of liquid when the valve seats on a valve seat at the inner end of the chamber.

10 Claims, 2 Drawing Sheets

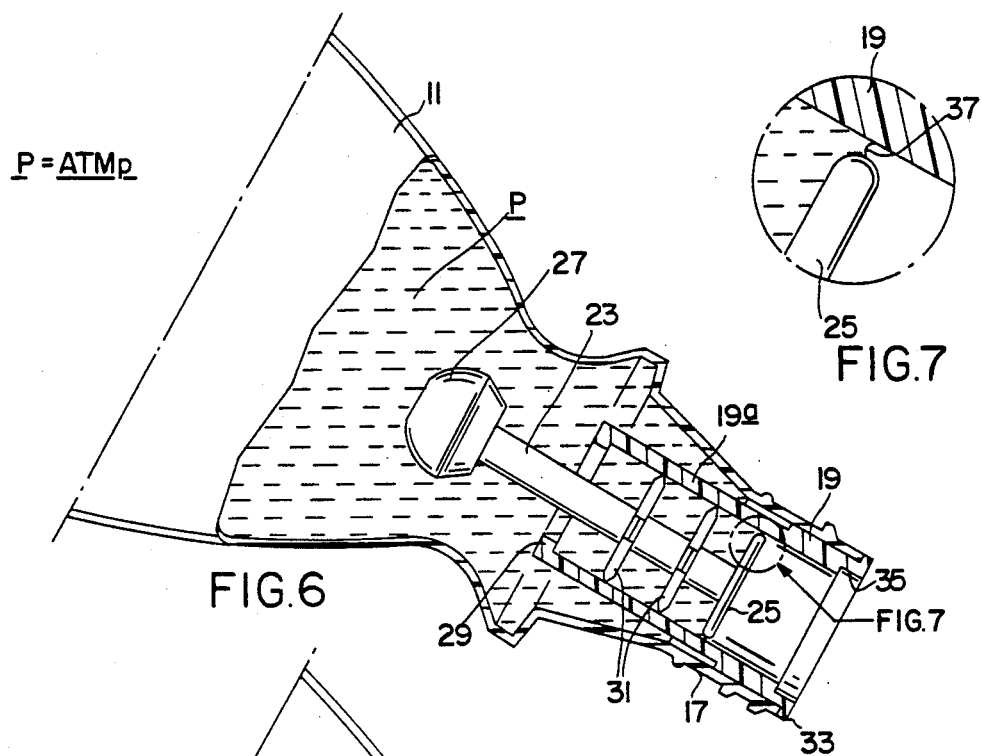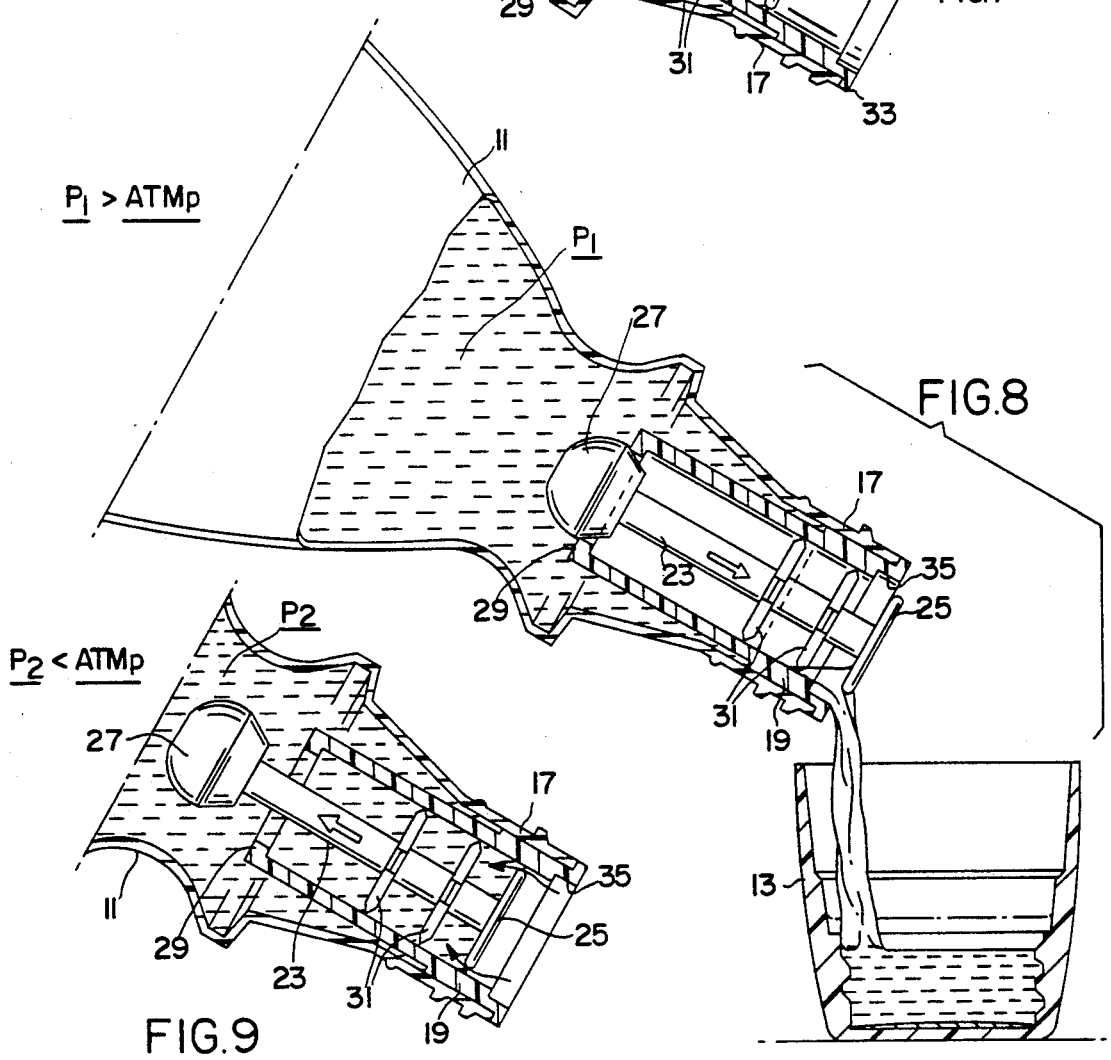

MEASURING DEVICE FOR DISPENSING PREDETERMINED QUANTITIES OF A LIQUID

FIELD OF THE INVENTION

The present invention relates to devices suitable for precisely dispensing exact, predetermined quantities of the contents of a container. The invention is admirably suitable for use with mouthwash, and other containers which contain less than a quart or liter of liquid.

BACKGROUND OF THE INVENTION

Products such as liquid detergents, soaps, bleaches, and fabric softeners are currently being sold in containers which require the user to determine the amount of liquid needed for a specific end use of the product. Some of these containers have caps which may also serve as measuring cups to assist the user in pouring out a desired quantity of the product. Hopefully, the user keeps the measuring cup close at hand after the product has been opened, such as when detergents are used in laundry rooms.

Instructions on the containers provide the user with helpful information in determining the correct, or optimum amount of liquid bleach, for example, to use for the intended size of the laundry load, types of clothes being cleaned, and particular fabrics. Other liquids, such as mouthwash and medicinal liquids, are also preferably dispensed with precision and accuracy.

It has been learned, however, in a survey of users of such liquids, that most people merely pour out an estimated amount of the liquid based primarily on their own judgment and experience, or lack thereof. Very few users bother to take the time to measure the precise quantity, either with or without the measuring cap, because doing so requires extra time and two hands. As a result, the quantity of product varies greatly from individual to individual, even though a precise dose is required. This happens in spite of the known fact that using too much or too little of the product will affect the success of the job, whether it is cleaning, freshening breath, dispensing cough syrup, or whatever. Obviously, too much product is wasteful and expensive, and in the case of medicines, may be dangerous.

It is generally recognized by bottle and cap manufacturers that a container dispensing system which is capable of providing an accurate measure quantity of product is highly desirable. At this time however, there is no known dispensing system being marketed because of the complexity and resulting unacceptable increase in cost of the product, particularly for smaller sized containers. One system for larger products, such as laundry detergent, has been proposed in my co-pending patent application, Ser. No. 07/400,492, filed Aug. 30, 1989, entitled LIQUID DISPENSING SYSTEM which issued as U.S. Pat. No. 5,044,527 on Sep. 3, 1991 and this system has been found to be very effective for such larger unit dose dispensing systems.

It is also noted that there is a mouthwash product on the market which contains an adjustable measuring dispensing system. In this system, the user squeezes the mouthwash plastic bottle to force liquid into an upper chamber, which is graduated with a scale. Once the desired amount of mouthwash is in the upper chamber, the cap of the bottle is removed and the measuring amount is poured out. The system utilizes a tiny orifice between the upper and lower chambers. It also includes a vent tube to the bottom of the bottle to carry fluid and vent the bottle when hand pressure is released. Such a system has not been effective because of its complexity and high cost. Most importantly, technical problems dealing with the orifice, vent tube and squeeze bottle continue to exist. Such a system has also not met with commercial acceptance.

There have also been other attempts to regulate the quantity of liquid removed from containers. In an 1886 U.S. Pat. No. 345,112, a double ended valve is placed in a cork in the neck of a bottle. This structure is added to the existing bottle so that the stopper supports the entire mechanism. There is, of course, no provision for using the bottle itself as part of the valve seat and there is no vent means provided. The design further employs a ball valve at the top of the mechanism and is clearly an expensive, decorative design intended for liquids which are to be consumed. It is typical of designs which would not be acceptable in the plastic bottle and cap industry because of their intricacy and cost.

Other prior art patents are also ineffective in suggesting a product useful for today markets. Specifically, Brawner, U.S. Pat. No. 646,349, describes a device for allowing a limited quantity of contents to be removed when the bottle is inverted and shaken. This is accomplished by a stopper which prevents escape of the contents unless the bottle is agitated, causing the stopper to move up and down. It does not appear that a measured quantity is thus likely to be removed from the container.

Similarly, U.S. Pat. No. 1,039,592, issued to Ray, describes a device which is designed for use with a bottle having an enlarged portion on its neck and a structure valve which engages a plurality of seats in the bottle. This design requires an unusual step function in the neck in order to provide a plurality of valve seats. None of these valves are valves which are seated from below.

Finally, Jockers, U.S. Pat. No. 2,630,593, employs a restricted passage and auxiliary chamber leading to a brush, so that the brush acts as a piston to facilitate the feed of the liquid. This is a metering apparatus which simply feeds liquid to the brush and is not a true dispensing system.

None of the above prior art patents teach or even suggest a dispenser which would accomplish the objects of the present invention. Prior art designs of the type described do not offer a simple, reliable, inexpensive and acceptable solution to the problem first described above. The desired product must be easy to manufacture and simple to use. Otherwise, the product will either be too expensive, or the consumer will merely ignore the device and continue to use an estimated amount as is their present practice.

Accordingly, it is a principle object of the present invention to provide a container dispensing system for liquids and flowable powders by providing a greatly simplified and inexpensive device for dispensing a predetermined measured amount each time the container is used.

Another object of this invention is to provide a container dispenser for liquids and flowable powders by providing a greatly simplified and inexpensive device for dispensing a precisely measured amount each time the container is used.

Another object of the present invention is to provide a container dispenser for liquids and for flowable powders which is easy, convenient, and desirable to use and which is pleasantly acceptable to consumers.

Yet another object of this invention is to provide a device for use in which only one hand is needed to dispense the predetermined measured amount.

Still yet another object of this invention is to provide a container device which dispenses accurate unit doses from containers of up to about a quart or liter in capacity.

One more object of the present invention is to provide a container dispenser of the type described which can be manufactured using a proven manufacturing technology and practices without special, difficult, or complicated production or assembly requirements. Other objects will appear hereinafter.

SUMMARY OF THE INVENTION

It has now been discovered that the above and other objects of the present invention may be accomplished in the following manner. Specifically, a device for dispensing a predetermined quantity of the contents of a container has been discovered.

The device of the present invention includes a flexible container which is capable of being reversibly deformed by squeezing. The container has a neck defining an opening for dispensing contents when the container is in a predetermined orientation. A chamber is mounted in the neck of the container. The chamber has a first end extending into the container and a second end aligned with the opening.

The device further includes a dispenser means which is mounted inside the chamber for regulating the quantity of fluid being dispensed. The dispenser includes a piston for leading flow of the contents, and the piston is sized to fit the chamber to form the front end of a volume defining chamber. The dispenser means also includes a seal means for sealing a first end to form the back end of that volume defining chamber. Connecting means for connecting the piston to the seal at a fixed distance from one another is also provided in order to define the totality of the volume.

In operation, deformation of the container forces the seal means to seal the first end and extend the piston beyond the second end of the chamber to permit discharge of only the contents which are enclosed by the volume defining chamber.

Typically, the piston is sized to fit the chamber such that the surface tension of a liquid in the container prevents passage of fluid between the piston and the chamber until the piston extends beyond the second end. In normal operation, therefore, the piston and chamber form what is known as a meniscus seal. Preferably, the cylinder and neck are both circular, so that the chamber is cylindrical in shape.

The connecting means is preferably a shaft axially centered and aligned within the chamber for connecting the seal and piston. The shaft preferably also includes at least one, and preferably two, guide means for cooperatively maintaining the shaft in axial alignment. These guide means include radially extending members which contact, or nearly contact, the inside wall of the chamber to maintain the axial alignment of the shaft.

The chamber which is to be mounted in the neck of the container has a neck engaging portion which provides for a snug friction fit, preferably near the outlet of the container. Also provided is an area inward of the opening of the container which is spaced from the chamber, primarily because the neck of the container may not be long enough to define an adequately large predetermined quantity of the contents. It is desirable that the piston flow uniformly along the entire length of the chamber, and therefore the chamber will extend down into the interior of the container.

BRIEF DESCRIPTION OF THE DRAWINGS

These and other objects of the present invention and the various features and details of the operation and construction thereof are hereinafter more fully set forth with reference to the accompanying drawings, where:

FIG. 6 is an enlarged fragmentary side elevational view similar to FIG. 3, but with the overcap removed and the bottle tilted to a pouring orientation.

FIG. 7 is a greatly enlarged fragmentary view of the detail contained within the dot and dash circle of FIG. 6 and designated FIG. 7, showing clearance between the piston and the inner cylinder wall along with the interface between the fluid and the atmosphere, shown as a meniscus seal.

FIG. 8 is a view similar to FIG. 6, showing the piston having been driven outward by the increase in bottle fluid pressure created by squeezing the sides of the bottle, to dispense the fluid therein.

FIG. 9 is a fragmentary sectional elevational view similar to FIGS. 6 and 8, showing the piston and air being drawn back into the cylinder upon release of the squeezing pressure.

DETAILED DESCRIPTION OF THE PREFERRED EMBODIMENT

Figure 2:
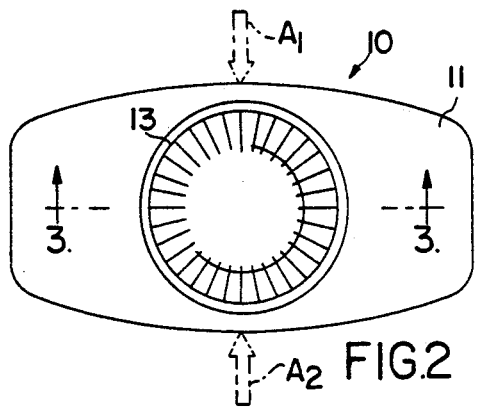
FIG. 2 is a plane view of FIG. 1.
Figure 1:
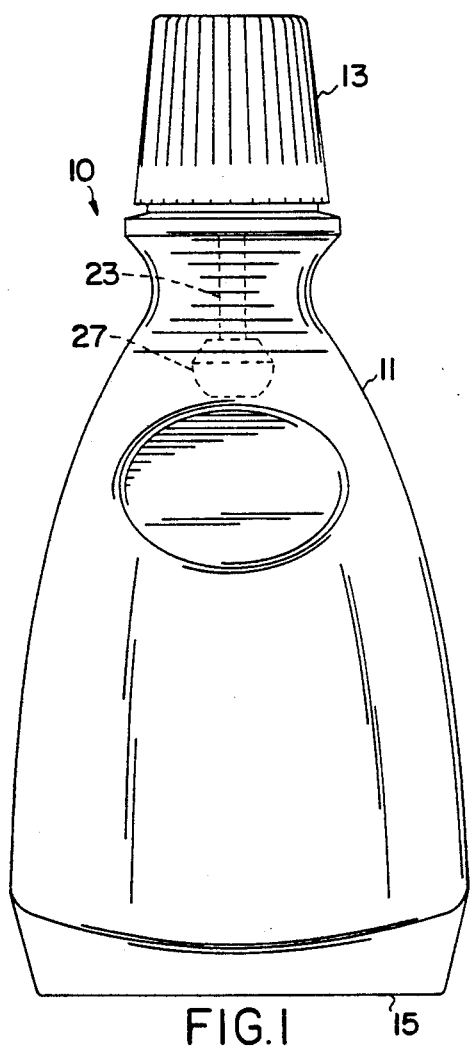
FIG. 1 is a side elevational view of a typical twelve (12) ounce flexible synthetic bottle equipped with the volumetric dispensing apparatus of this invention.

Shown generally by reference numeral 10 in FIG. 1 is a typical twelve (12) ounce flexible synthetic bottle equipped with the device of the present invention. The bottle 11 is a flexible container capable of being reversibly deformed by squeezing and contains a cap 13 which may optionally serve as a cup or receptacle, if, for example, the contents are to be consumed or added to another container. The contents are removable by pouring, as hereinafter described, and squeezing pressure may be exerted such as in the direction shown by arrows A1 and A2 in FIG. 2.

Figure 3:
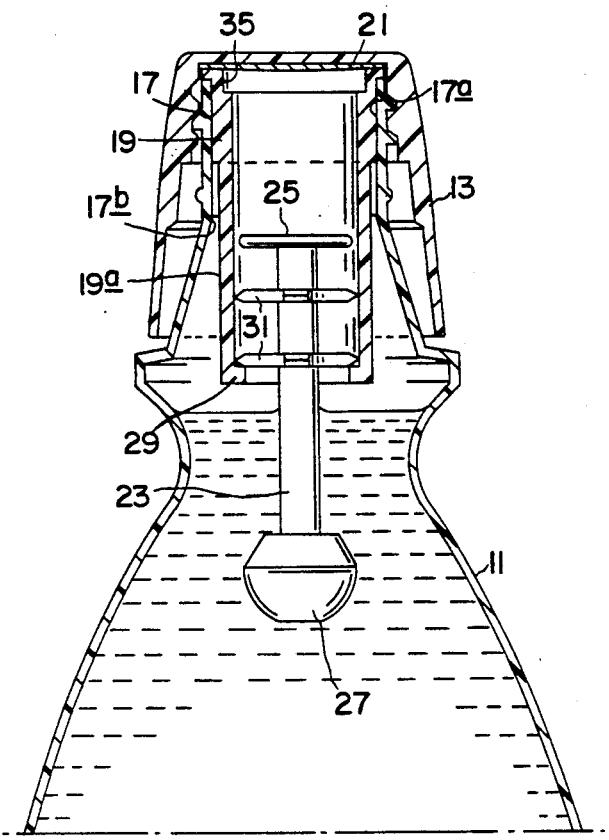
FIG. 3 is an enlarged fragmentary sectional elevational view taken along line 3,3 of FIG. 2, showing details of the volumetric dispensing apparatus of the present invention.

In the enlarged fragmentary sectional elevational view of FIG. 3, the details of the volumetric dispensing apparatus are shown. Specifically, the bottle neck 17 includes a cylindrical portion 17A and a radially divergent part 17B. A chamber 19 is snugly fit into neck 17 and is held frictionally between the inner wall 17A of neck 17 and the upper exterior of chamber 19. A seal liner 21 may be placed across the entire opening at the end of neck 17 and chamber 19 as a tamper evident indicator and as a effective method for sealing the container prior to purchase and use by the consumer.

Contained in chamber 19 is a piston 23, having a piston head 25 at the exit end of the chamber and a valve 27 at the internal end of the chamber 19. The valve 27 is designed to mate with the valve seat 29 and effectively seal the chamber 19 from the container 11, as will be described in greater detail herein below. Piston 23 is kept in axial alignment by one or more guide members 31 which have a plurality of radially extending arms for contact, or near contact, with the internal wall of the chamber 19. Combined with the piston head 25, the guide means 31 maintain alignment of the piston shaft 23 so that the valve 27 arrives at the valve seat 29 in an axially aligned position for effective sealing.

Figure 4:
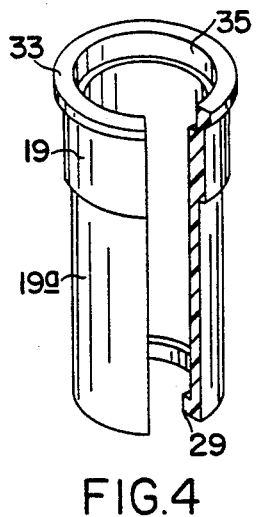
FIG. 4 is an enlarged isometric view of the piston cylinder, with a portion broken away and in section, in order to clearly show both exterior and interior details of the piston cylinder insert and valve seat.
Figure 5:
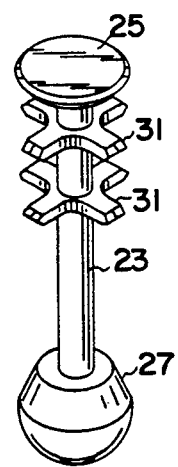
FIG. 5 is an isometric view of the piston and valve.

The chamber 19 is shown in FIG. 4, partially broken away and in section, in order to show the exterior and interior details. Specifically, the valve seat 29 is sized to mate with the valve 27 as previously described. The upper end 33 is formed into a lip, upon which the seal liner 21 may be placed. The inside portion of the upper lip 33 includes an enlarged diameter portion 35 at the terminal end of the cylinder 19. As will be described below, this enlarged diameter terminal end 35 allows the predetermined quantity of fluid contained within the cylinder 19 to be dispensed when the bottle 11 is placed in a dispensing orientation and is squeezed.

Turning now to FIG. 6, the bottle 11 is shown in a dispensing orientation with the cap 13 and seal liner 21 removed. The container 11 is filled primarily with liquid, but there is also a certain amount of air trapped within the bottle. The bottle 11 is at atmospheric pressure in FIG. 6. As the bottle 11 is tipped, fluid flows into chamber 19 and the piston head 25 leads a flow of the liquid. Because of the surface tension of the liquid, and the clearance between the piston head 25 and chamber 19, passage of fluid out of the container is prevented. The container pressure, which is atmospheric in this condition, is balanced by the pressure outside the container 11, and the piston 23 reaches some point of equilibrium where the valve 27 has not yet seated on the valve seat 29 and the piston head 25 has not yet reached the enlarged portion 35 of the chamber end 33. The details of the meniscus seal 37 between wall 19 and piston head 25 are shown, greatly enlarged, in FIG. 7. The surface tension prohibits liquid flow past the piston head 25 and yet there is clearance for air to flow as shown below.

Turning now to FIG. 8, the pressure in container 11 is increased by squeezing the bottle as previously described. This causes additional fluid to flow into chamber 19. The transfer chamber is defined, and has a volume extending from the piston head 25 to the junction of the valve 27 and the valve seat 29. The maximum amount of liquid which can be expelled in one discharge is defined by the size of the chamber 19 between the two ends thereof. The measured fluid volume contained in the chamber 19 is dispensed because the piston head 25 extends into the enlarged diameter terminal end 35. Since the guide means 31 does not function as a piston, all of the fluid contained in the chamber 19 from the valve 27 forward will be poured, for example, into a cup 13.

In some instances, squeezing the flexible bottle produces an audible sound, which some believe resembles the sound of a "cricket". This sound indicates that the full amount of fluid has been transferred to the chamber 19 and that the valve 27 has seated in the valve seat 29. This is particularly useful for persons desiring to use the device who have less than average vision.

As shown in FIG. 9, the end of the bottle 11 shows the piston head 25 and air being drawn into the cylinder 19 upon release of the squeezing pressure, which causes the pressure in the container 11 to be less than atmospheric. Because of the clearance between the piston head 25 and the cylinder 19, and the meniscus seal, no separate air vent is needed. The pressures will equalize at atmospheric pressure in due course, and the equilibrium condition as shown in FIG. 6 will be achieved. Thus, the device can be used as long as there is additional liquid in the container 11 without requiring it to be reinverted, and the same precise quantity can be dispensed each time.

As has been noted above, the surface tension of the liquid has an effect on the volume of fluid which will be contained in the chamber for a particular distance between the valve head 25 and the interior surface of cylinder 19. For example, initial tests using water demonstrated the feasibility of the dispenser, including the previously noted cricket sound. Also a commercially available mouthwash was used in place of water, with different results. Adjustment for the specific surface tension again produced reputable results. Using the same fluid and the same clearances, uniformity testing produced a result which shows a number of pours having uniform volume dispensed, within plus or minus 3.5%. In these tests, the amount of mouthwash poured averaged 8 milliliters, or approximately 1 teaspoon. Volumes poured were recorded to the nearest 0.25 milliliters which corresponds to the limitations of the human eye. In summary, this plus or minus 3.5% is better than any other method presently known for the uniform dispensing of fluids.

While particular embodiments of the present invention have been illustrated and described herein, it is not intended to limit the invention. Changes and modifications may be made therein within the scope of the following claims.

What is claimed is:

1. A device for dispensing a predetermined quantity of a liquid having a predetermined viscosity comprising:
    a container having an elongated neck with a chamber having an inner wall, an inner end and discharge opening at its outer end;
    piston means mounted for axial movement in said chamber having a predetermined clearance with said inner wall of said chamber and forming a meniscus seal with said chamber whereby the surface tension of the liquid prevents passage of liquid between said piston means and the inner wall; and
    a valve member connected to said piston means and adapted to form a seal with the inner end of said chamber when said piston mean is disposed adjacent the discharge opening, said piston means operable between an inner limit position permitting flow of liquid from the container to said chamber and an outer limit position wherein said valve member seals the inner end of said chamber and the surface tension of said liquid between said piston means and the inner wall is broken and a predetermined quantity of the liquid can be discharged from the container.

2. The device of claim 1, wherein said neck has a circular cross section and said chamber is cylindrical in shape.

3. The device of claim 2, wherein said piston means is sized to fit said chamber such that the surface tension of the liquid prevents passage of liquid therebetween until said piston means extends beyond said outer end.

4. The device of claim 1, wherein said piston means and valve member are connected by a shaft axially aligned within said chamber.

5. The device of claim 4, wherein said shaft includes at least one guide means for cooperatively maintaining said shaft in said axial alignment.

6. The device of claim 1, wherein said chamber includes an outer terminal enlarged portion extending beyond said discharge opening.

7. A device as claimed in claim 1 wherein said chamber is formed by an elongated tubular insert of predetermined uniform cross-section throughout its length having a stepped portion at the discharge opening and a radially inwardly directed rib at its inner end.

8. A device for dispensing a predetermined quantity of liquid contents having a predetermined viscosity comprising:
   a flexible container capable of being deformed by squeezing, having a neck defining a discharge opening for dispensing liquid contents when said container is in a predetermined orientation;
   a chamber in said neck having a first and extending into the container and a second end defining the discharge opening;
   means mounted in said chamber for controlling discharge of predetermined volume of the liquid contents including piston means of a cross section to form a meniscus seal with said chamber and seal means for sealing said first end and shaft means connecting said piston means to said seal means at a fixed distance therebetween to define said predetermined volume when said seal means is sealed in said first end, said shaft means including at least one guide means for maintaining said piston means in axial alignment with the axis of said chamber;
   deformation of said container forces said seal means to seal said first end and extend said piston means beyond said second end to permit discharge only the predetermined volume of the liquid contents from said chamber.

9. A device for dispensing a predetermined quantity of liquid contents having a predetermined viscosity in a container, comprising:
   a flexible container capable of being deformed by squeezing and having an elongated neck having a discharge opening for dispensing contents when said container is in a predetermined orientation;
   a chamber having an axis mounted in said neck having a first inlet and extending into the container and a second end adjacent said discharge opening; and
   means mounted in said chamber for controlling discharge of a predetermined volume of the liquid contents, including a piston of a cross section to form a meniscus seal with said chamber, seal means for sealing said first end and shaft means connecting said piston to said seal means at a fixed distance therebetween to define the predetermined volume of liquid contents when said seal means is sealed in said first end, said shaft means including at least one guide means for maintaining the piston in axial alignment with the axis of the chamber;
   whereby deformation of said container forces said seal means to seal said first end and extend said piston beyond said second end to permit discharge of only the contents in said chamber.

10. The device of claim 9, wherein said piston is sized to fit said chamber such that the surface tension of said liquid contents prevents passage of said liquid contents therebetween until said piston extends beyond said second end.

* * * * *